UNITED STATES PATENT OFFICE.

GEORGE A. RICHTER, OF BERLIN, NEW HAMPSHIRE, ASSIGNOR TO BROWN COMPANY, OF BERLIN, NEW HAMPSHIRE, A CORPORATION OF MAINE.

PROCESS OF MANUFACTURING LACTIC ACID.

1,305,623.     Specification of Letters Patent.     Patented June 3, 1919.

No Drawing.     Application filed November 2, 1917. Serial No. 199,985.

*To all whom it may concern:*

Be it known that I, GEORGE A. RICHTER, a citizen of the United States, residing at Berlin, in the county of Coos and State of New Hampshire, have invented new and useful Improvements in Processes of Manufacturing Lactic Acid, of which the following is a specification.

This invention consists of a process of producing lactic acid, in which lactic acid is employed as the active agent in the hydrolysis of the raw material.

In accordance with my process, sawdust or its equivalent is first hydrolyzed with lactic acid, this operation producing a mixture of lactic acid, reducing sugars, water and a residuum. After filtering the product, the filtrate, which consists of a mixture of lactic acid, sugars and water, is neutralized with an excess of calcium carbonate, and is then fermented by lactic acid bacteria. The calcium carbonate is added in a quantity sufficiently in excess of that required for the neutralization of the lactic acid in the mixture, last referred to, that, as lactic acid is formed during the process of fermentation, it is immediately reacted upon by the calcium carbonate and thus removed from the fermentation mass as calcium lactate. Upon completion of the fermentation process, the calcium lactate is treated with sulfuric acid to precipitate the calcium in the form of calcium sulfate, and to leave the lactic acid in solution. The precipitate, which is insoluble, is removed by filtration, and the lactic acid remaining in solution is concentrated by evaporation. A small part of this lactic acid may then be used for the hydrolysis of a second batch of raw material, thus completing the cycle.

In practice, in the hydrolysis of sawdust or other suitable carbohydrate with lactic acid, a .5% aqueous solution of the latter is preferably utilized, and about 1 part of sawdust to 8 parts of the lactic acid solution are placed in a closed digester and boiled under a suitable pressure, say 150 pounds pressure (at about a temperature of 150° C.) for about two hours more or less. The contents of the digester are drawn off, and, as previously stated, are filtered, leaving as the filtrate, lactic acid, the reducing sugars and water. Enough calcium carbonate is added to neutralize the lactic acid present, and that formed by subsequent fermentation as previously stated, after which the lactic acid bacteria are added to ferment the reducing sugars present. Sufficient sulfuric acid is added to precipitate the calcium in the form of calcium sulfate and leave the lactic acid in solution. The resulting mixture is filtered to remove the precipitate, leaving a solution of water and lactic acid. Any suitable method of evaporating and concentration may then be followed, to concentrate the lactic acid in condition for commercial use.

For filtering the products of hydrolysis, an ordinary filter press or a centrifugal filter may be utilized. In removing the calcium sulfate from the fermented product, a filter press is preferably employed. The residuum from the products of hydrolysis after filtering or centrifugating may be utilized in the manufacture of oxalic acid by any well known process.

One of the advantages of a process embodying the invention resides in the fact that, by using lactic acid as the hydrolyzing agent, I obviate a separate step which is necessary in previous commercial operation, to wit, that of recovering the hydrolyzing agent, since in my process the lactic acid initially employed as the hydrolyzing agent is automatically recovered with that resulting from the fermentation. Again, an excess of lactic acid in the sugar solution does not retard the fermentation, such as is the case when sulfuric or hydrochloric acid is used in hydrolyzing the raw material.

What I claim is:

1. A process of making lactic acid which consists in hydrolyzing sawdust or other equivalent carbohydrate with lactic acid, fermenting the reducing sugars resulting from such hydrolysis with lactic acid bacteria, and removing the lactic acid resulting from such fermentation.

2. A process of making lactic acid which consists in hydrolyzing sawdust or other equivalent carbohydrate with lactic acid, adding calcium carbonate in excess of the resulting sugar solution, fermenting the reducing sugars resulting from said hydrolysis with lactic acid bacteria, treating the resulting calcium lactate with an acid reagent to form an insoluble precipitate and lactic acid, and recovering the lactic acid.

3. A process of making lactic acid which consists in hydrolyzing sawdust or other equivalent carbohydrate with an aqueous lactic acid solution, fermenting the reducing sugars resulting from such hydrolysis with lactic acid bacteria, and recovering the lactic acid used as the hydrolyzing agent and that produced by the fermentation.

4. A process of making lactic acid which consists of hydrolyzing sawdust or other equivalent carbohydrate with an aqueous lactic acid solution, filtering the products of hydrolysis, adding calcium carbonate in excess to the filtrate, fermenting the reducing sugars of such filtrate with lactic acid bacteria, treating the resulting calcium lactate with an acid reagent to form lactic acid and an insoluble calcium-compound precipitate, and removing the precipitate by filtration and recovering the resulting lactic acid.

In testimony whereof I have affixed my signature.

GEORGE A. RICHTER.